(12) United States Patent
Polonsky

(10) Patent No.: US 8,213,714 B1
(45) Date of Patent: Jul. 3, 2012

(54) METHOD, DEVICE AND COMPUTER PROGRAM PRODUCT FOR PERFORMING A GAMUT BASED WHITE BALANCE OF A DIGITAL IMAGE

(75) Inventor: Shlomo Polonsky, Modi'in (IL)

(73) Assignee: Pixim Israel Ltd., Ra'anana (IL)

( * ) Notice: Subject to any disclaimer, the term of this patent is extended or adjusted under 35 U.S.C. 154(b) by 1050 days.

(21) Appl. No.: 12/122,699

(22) Filed: May 18, 2008

(51) Int. Cl.
*G06K 9/00* (2006.01)
(52) U.S. Cl. ........ 382/167; 362/293
(58) Field of Classification Search ........ 382/162, 382/167; 362/293
See application file for complete search history.

(56) References Cited

U.S. PATENT DOCUMENTS

| | | | | |
|---|---|---|---|---|
| 5,448,502 | A * | 9/1995 | Kindo et al. | 382/165 |
| 6,411,331 | B1 * | 6/2002 | Sansom-Wai et al. | 348/223.1 |
| 2002/0163529 | A1 * | 11/2002 | Evanicky | 345/600 |
| 2004/0095478 | A1 * | 5/2004 | Takano et al. | 348/223.1 |

* cited by examiner

*Primary Examiner* — Matthew Bella
*Assistant Examiner* — Eueng-Nan Yeh
(74) *Attorney, Agent, or Firm* — Reches Patents

(57) ABSTRACT

A method for performing a color gamut based white balancing of a digital image, the method includes: determining at least one filtering parameter based upon a relationship between candidates and color gamuts that are associated with different illumination conditions; wherein each candidate represents a pixel area; selecting selected candidates by filtering the candidates; wherein the filtering is responsive to at least one filtering parameter; calculating at least one white balance compensation parameter in response to pixel information of the selected pixel areas; and providing a compensated digital image by applying at least one white balance compensated parameter.

21 Claims, 8 Drawing Sheets

METHOD, DEVICE AND COMPUTER PROGRAM PRODUCT FOR PERFORMING A GAMUT BASED WHITE BALANCE OF A DIGITAL IMAGE

BACKGROUND OF THE INVENTION

This application incorporates by reference US patent application titled "Method, device and computer program product for performing white balancing of a digital image" and US application titled "Method, device and computer program product for performing a color based white balance of a digital image", all being concurrently filed in the United States of America.

FIELD OF THE INVENTION

The invention relates to the field of digital color image processing and especially to white balancing of a digital image.

DESCRIPTION OF THE PRIOR ART

The human eye can adjust to varying illumination conditions. Digital images should undergo a compensation process that is known as white balancing in order to adjust digital images to varying illumination conditions. This process is referred to as white balancing because its goal is to represent white objects as white, regardless of the illumination condition.

Some prior art white balancing methods are highly complex and require computational resources that are available only in costly hardware, other prior art methods process the whole digital image and are time consuming. Various prior art methods and systems for white balancing are described in the following patents and patent applications, all being incorporated herein by reference: U.S. Pat. No. 7,151,563 of Masayu, U.S. Pat. No. 6,873,727 of Lopez et al., U.S. Pat. No. 7,006,135 of Ishimaru et al., and U.S. Pat. No. 6,839,088 of Dicarlo et al.

U.S. Pat. No. 6,952,225 of Hyodo et al., disclosed a white balancing method that starts by determining a luminance level of a subject and then processes pixel information to determine a type of light source. The type of white source is determined in response to the luminance level and in response to a result of a processing of pixel information. The white balance is adjusted according to the type of light. The pixel information processing is preformed in a non-linear R/G, B/G color space. The x-axis of this space represents a ratio between Red pixel value and Green pixel value (R/G). The y-axis of this space represents a ratio between Blue pixel value and Green pixel value (R/G, B/G). Various small and mostly non-overlapping zones (in the R/G, B/G space) are allocated per each illumination condition, one zone for sky blue and the other for skin tone under daylight. Pixel information that only fall into these zones can assist in selecting the illumination condition. These zones cover a small portion of the R/G, B/G space, are not accurate and their definition can lead to various errors. For example, a daylight criterion may fail, for example, for blue object under fluorescent, yet for another example, skin is detected only under daylight illumination and the skin zone overlaps a cool white fluorescent, leading to errors.

There is a growing need to provide a robust and reliable white balancing method, device, and computer program product.

SUMMARY OF THE INVENTION

A computer program product that comprises a tangible computer readable medium that stores code that once executed by a computer causes the computer to: determine at least one filtering parameter based upon a relationship between candidates and color gamuts that are associated with different illumination conditions; wherein each candidate represents a pixel area; select selected candidates by filtering the candidates; wherein the filtering is responsive to at least one filtering parameter; calculate at least one white balance compensation parameter in response to pixel information of the selected pixel areas; and provide a compensated digital image by applying at least one white balance compensated parameter.

A device having color gamut based white balancing capabilities, the device comprises a processor and a memory unit; wherein the memory unit stores the digital picture; wherein the processor is adapted to: determine at least one filtering parameter based upon a relationship between candidates and color gamuts that are associated with different illumination conditions; wherein each candidate represents a pixel area; select selected candidates by filtering the candidates; wherein the filtering is responsive to at least one filtering parameter; calculate at least one white balance compensation parameter in response to pixel information of the selected pixel areas; and provide a compensated digital image by applying at least one white balance compensated parameter.

A method for performing a color gamut based white balancing of a digital image, the method comprises: determining at least one filtering parameter based upon a relationship between candidates and color gamuts that are associated with different illumination conditions; wherein each candidate represents a pixel area; selecting selected candidates by filtering the candidates; wherein the filtering is responsive to at least one filtering parameter; calculating at least one white balance compensation parameter in response to pixel information of the selected pixel areas; and providing a compensated digital image by applying at least one white balance compensated parameter.

DETAILED DESCRIPTION OF THE DRAWINGS

A white balancing method, device and computer program product are provided.

Multiple areas of digital pixels are represented by candidates that have a pair of chromaticity values that are calculated from color information of these areas of pixels. A selection process selects candidates that have chromaticity values that are located within any of these color gamuts.

A candidate is an information unit that represents color information of a pixel area. It has a pair of chromaticity values. It is termed candidate because it can affect the white balancing process or can be ignored.

After the selection process ends, at least one white balance compensation parameter is calculated in response to selected candidates.

At least one white balance compensation parameter can be used to provide a compensated digital image.

Candidates that have their chromaticity values in proximity to a color gamut but outside the color gamut can also be taken into account—resulting in a further increment of the number of "relevant" candidates.

The white balancing is simplified by processing chromaticity values of candidates, especially when the number of the candidates is much smaller than the number of pixels of the digital image.

Conveniently, the white balancing is further simplified by generating chromaticity values within a linear chromaticity space in which a black body line is horizontal.

Figure 7:
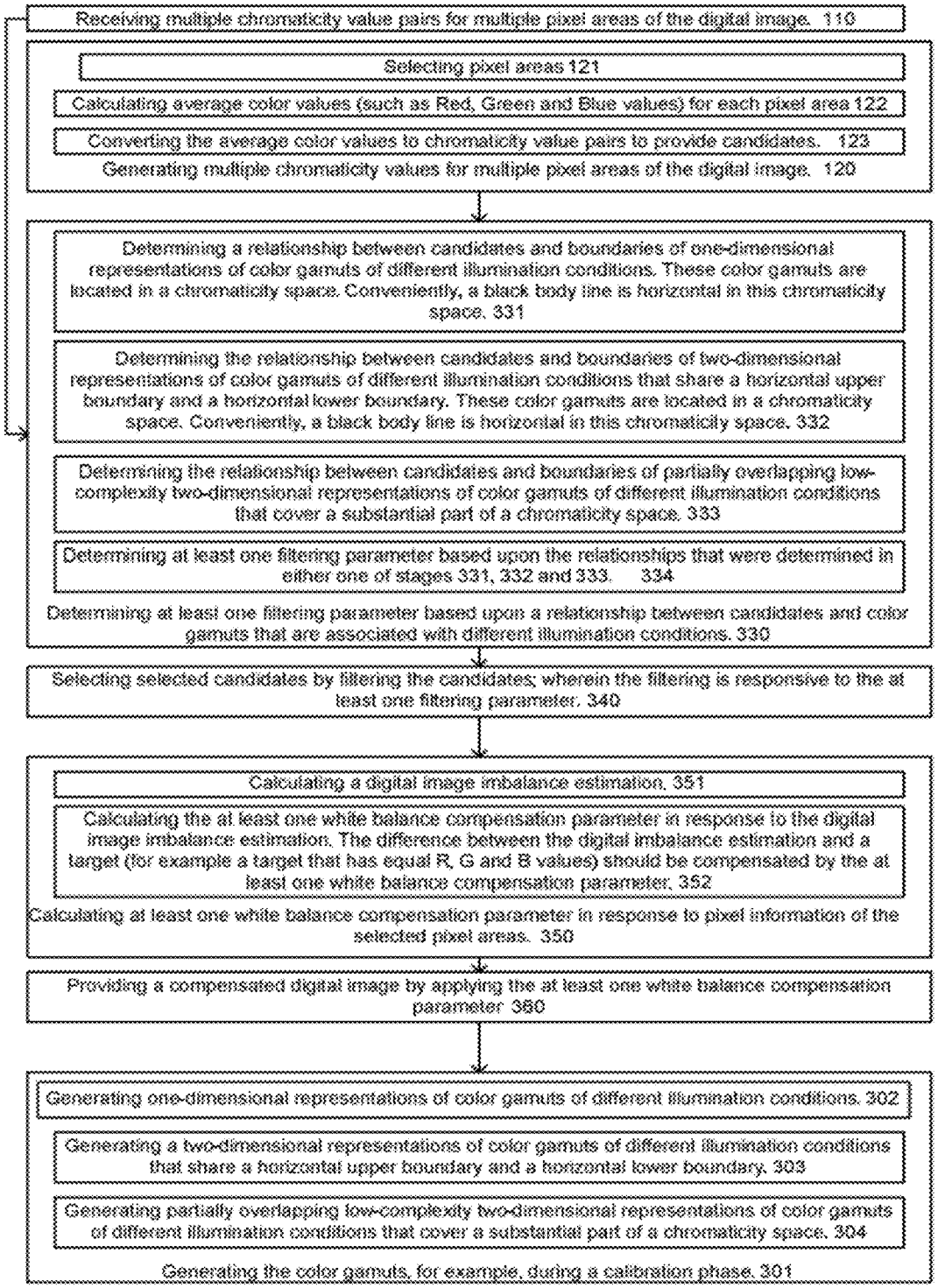
FIG. 7 is a flow chart of a method according to an embodiment of the invention.

FIG. 7 illustrates method 300 according to an embodiment of the invention.

Method 300 starts by stage 110 or 120.

Stage 110 includes receiving multiple chromaticity value pairs for multiple pixel areas of the digital image. Stage 110 includes receiving multiple candidates.

Stage 120 includes generating multiple chromaticity values for multiple pixel areas of the digital image. Stage 120 includes generating candidates.

Stage 120 can include at least one of the following stages or a combination thereof: (i) stage 121 of selecting pixel areas; (ii) stage 122 of calculating average color values (such as Red, Green and Blue values) for each pixel area; and (iii) stage 123 of converting the average color values to chromaticity value pairs to provide candidates. The chromaticity values of the candidates can be within a chromaticity space in which a black body line is horizontal but this is not necessarily so.

Figure 1:
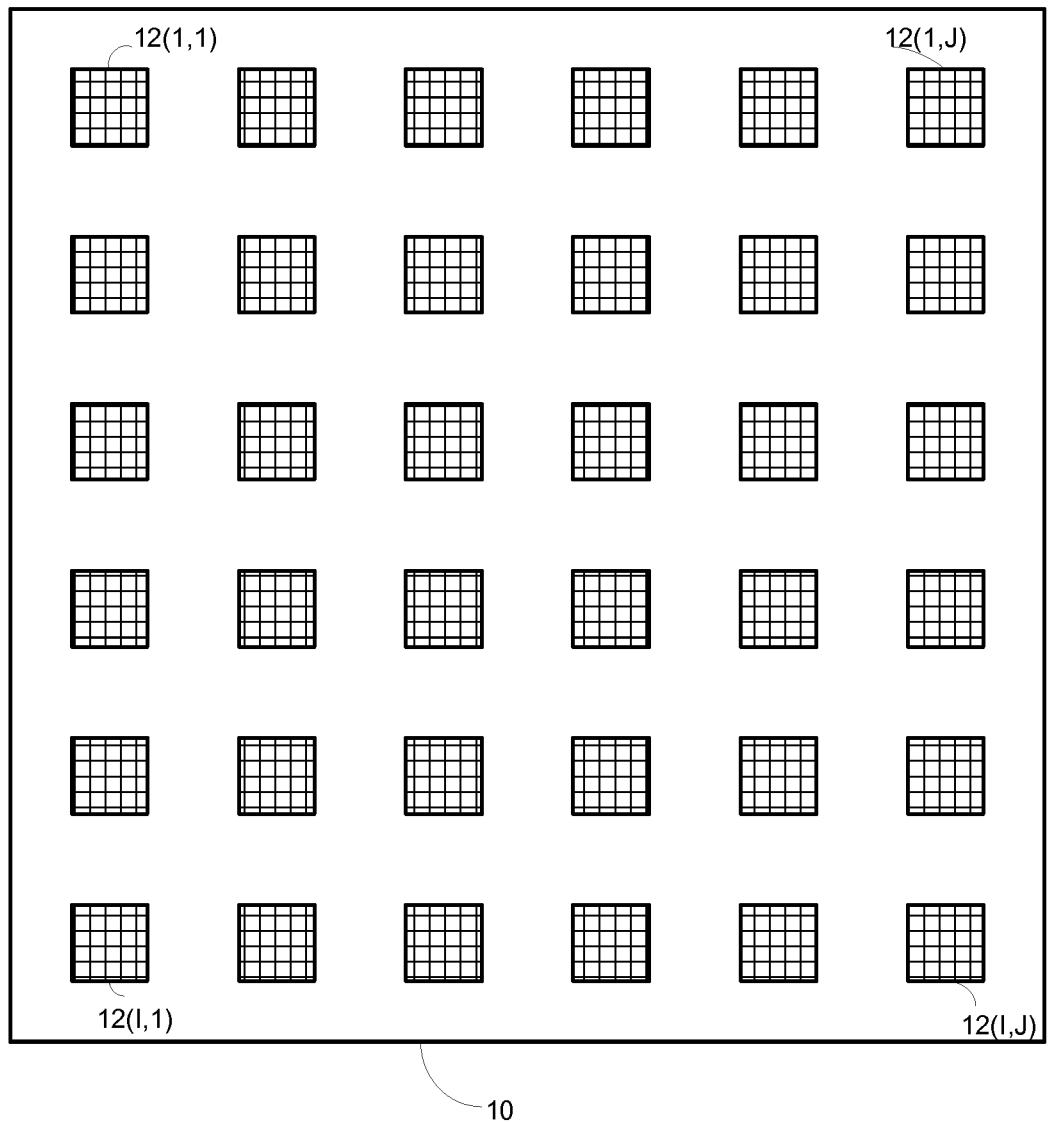
FIG. 1 illustrates a digital image and multiple pixel areas according to an embodiment of the invention.

FIG. 1 illustrates digital image 10 and multiple pixel areas 12(1,1)-12(I,J) according to an embodiment of the invention.

Indices I and J are positive integers. FIG. 1 is out of scale and the pixels within all the pixel areas can be only a small fraction of the overall pixels of digital image 10. A pixel area and the number of pixel areas can be relatively small. For example, the number of pixel areas can be 8×8, 10×10, 16×12, 20×20, and the like, and the number of pixels per pixel area can include, for example, 2×2, 4×4, 8×8, 10×10 pixels and the like.

The pixel areas can be a square shape but this is not necessarily so. The pixel areas can spread in a homogenous manner but this not necessarily so. For example, pixel areas can be spread over the complete digital image or mostly located in one or more portions (for example a central portion) of digital image 10.

Each pixel area (for example $12(i,j)$) is represented by a pair of chromaticity values x'(i,j) and y'(i,j). These chromaticity values can be calculated by: (i) calculating, for that pixel area, average colors values R(i,j), B(i,j), G(i,j), wherein these average color values can be arithmetic mean, geometric mean, weighted averages and the like; (ii) converting these average color values to a pair of chromaticity values x' and y':

$x'(i,j) = x(i,j) \cdot \cos \alpha + y(i,j) \cdot \sin \alpha,$ $y'(i,j) = -x(i,j) \cdot \sin \alpha + y(i,j) \cdot \cos \alpha,$ Wherein:

$x(i,j) = \frac{G(i,j) \cdot B(i,j)}{R(i,j) \cdot G(i,j) + G(i,j) \cdot B(i,j) + R(i,j) \cdot B(i,j)},$ $y(i,j) = \frac{G(i,j) \cdot R(i,j)}{R(i,j) \cdot G(i,j) + G(i,j) \cdot B(i,j) + R(i,j) \cdot B(i,j)},$ and α is the angle between a black body line and an x-axis of a (x,y) chromaticity space, before the black body line is rotated.

Figure 2A:
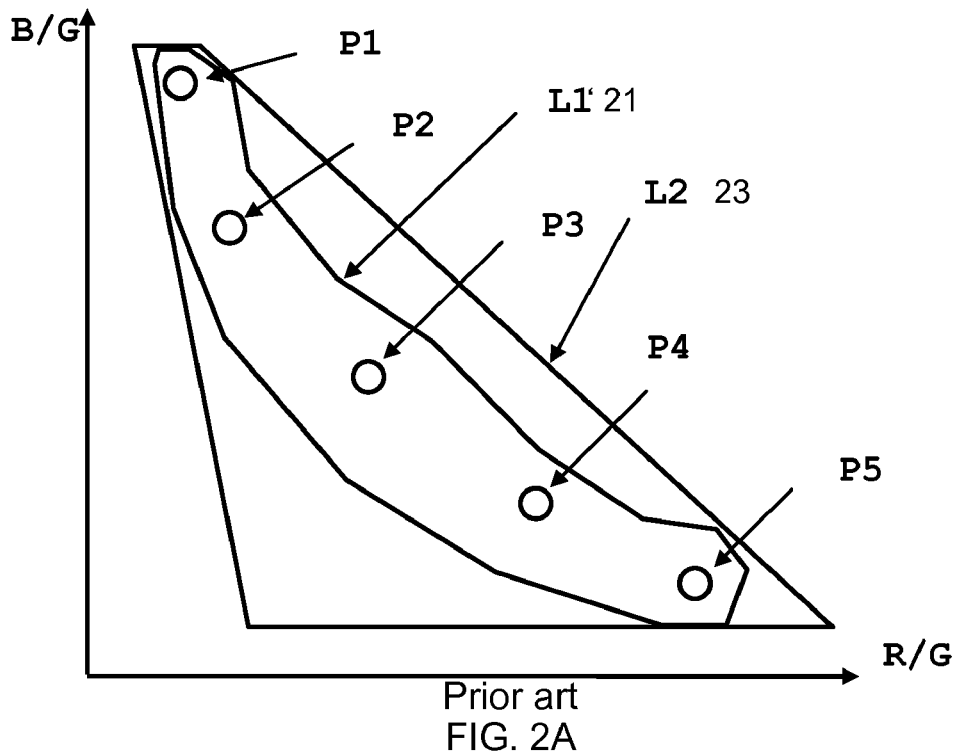
FIG. 2A illustrates a prior art (R/G, B/G) space and gray gamuts.

FIG. 2A illustrates a prior art (R/G, B/G) space that in which L1' 21 is a gray polygon that is not linear. Its shape complicates the determination of whether a pair of R/G, B/G values is within the polygon or not. Due to this complexity it was suggested to replace L1' 21 by trapezoid L2 23. It is noted that trapezoid L2 23 is much larger than L1, 21 and using it results in significant inaccuracies.

Figure 2B:
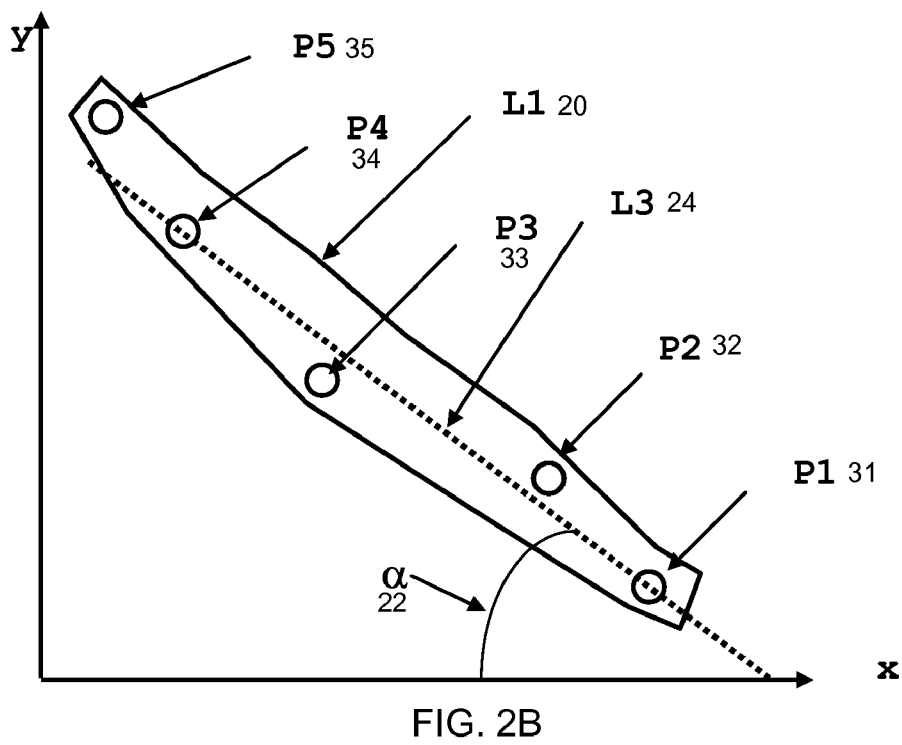
FIG. 2B illustrates an oriented gray gamut and a black body line, according to an embodiment of the invention.

FIG. 2B illustrates an oriented gray gamut L1 20 and a black body line L3 24 that is oriented at angle α 22 in relation to an x-axis of a chromaticity space (x,y), according to an embodiment of the invention.

The rotated chromaticity space has several advantages over the prior art (R/G, B/G) space: (i) The (R/G, B/G) space is very non-linear in a sense that black-body locus is close to hyperbola, and the gray candidates region has a half-moon shape (not-convex!). As s result, the calculations (whether the candidate is inside the region, distance to the region etc) are complex, or the simplified region is very inaccurate; (ii) the inverse space (G/R, G/B) is not uniform (the ends are stretched too much, because of the possibly small values in the denominator); (iii) the space of gains (x, y) where x=WR/(WR+WG+WB), y=WB/(WR+WG+WB) includes an oriented black body, which complicates geometric calculations, (iv) The rotated chromaticity space is close to linear, more uniform, allows usage of Euclidian geometry with better results, and as the gray region is a narrow band oriented horizontally, it simplifies calculations significantly.

Figure 3:
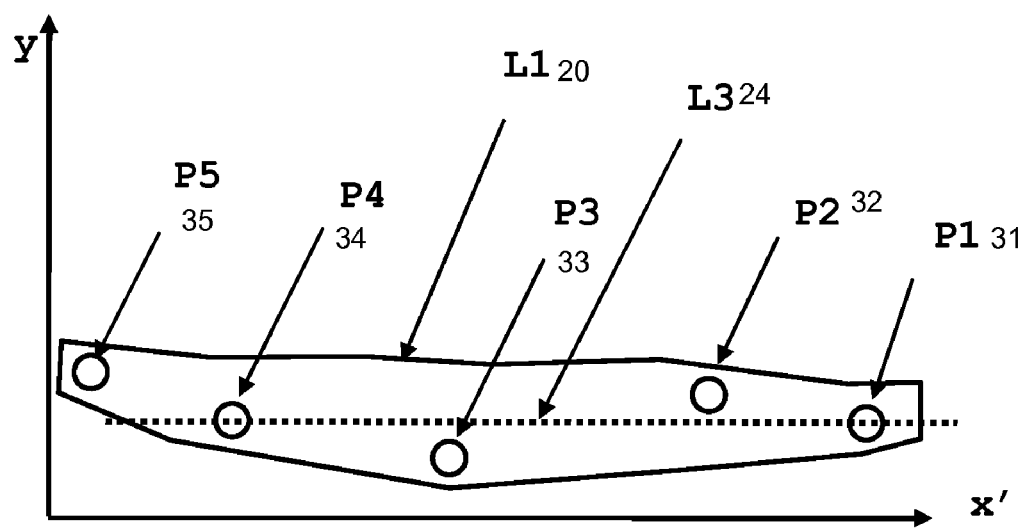
FIG. 3 illustrates multiple points, a gray gamut and a horizontal black body line after being rotated, according to an embodiment of the invention.

Points P1 31, P2 32, P3 33, P4 34, and P5 35 have chromaticity value pairs that correspond to a typical daylight gray point, a typical daylight or fluorescent illumination gray point, a typical cool white fluorescent illumination gray point, a typical incandescent illumination gray point, and a typical warm white fluorescent illumination gray point. FIG. 3 illustrates points P1-P5 31-35, gray gamut L1 20, and horizontal black body line L3 24 after being rotated by α 22, according to an embodiment of the invention.

Using a chromaticity space simplifies the calculation as even in an oriented format the gray polygons are more linear than the polygons of the R/G, B/G space. The rotation further simplifies the calculation of a spatial relationship between gray gamut L2 20 (and portions of that gamut that can be associated with different illumination conditions) and various chromaticity value pairs that of pixel areas. The same applies to non-gray color gamuts.

Referring back to FIG. 7, stages 110 and 120 are followed by stage 330 of determining at least one filtering parameter based upon a relationship between candidates and color gamuts that are associated with different illumination conditions.

Stage 330 can include at least one stage out of stages 331, 332, 333 or 334 or a combination thereof.

Stage 331 includes determining a relationship between candidates and boundaries of one-dimensional representations of color gamuts of different illumination conditions.

These color gamuts are located in a chromaticity space. Conveniently, a black body line is horizontal in this chromaticity space.

Stage 332 includes determining the relationship between candidates and boundaries of two-dimensional representations of color gamuts of different illumination conditions that share a horizontal upper boundary and a horizontal lower boundary. These color gamuts are located in a chromaticity space. Conveniently, a black body line is horizontal in this chromaticity space.

Stage 333 includes determining the relationship between candidates and boundaries of partially overlapping low-complexity two-dimensional representations of color gamuts of different illumination conditions that cover a substantial part of a chromaticity space.

Stage 334 includes determining at least one filtering parameter based upon the relationships that were determined in stage 330.

These illumination conditions can be determined by one or more outmost candidates—candidates that have the highest absolute value of X'. For example, a pair of outmost candidates can determine the illumination (for example, a right outmost candidate and a left outmost candidate). Yet for another example multiple pair of outmost and almost outmost candidates can determine the illumination condition.

The filtering parameters can be the boundaries of a portion of a gray polygon. A more detailed explanation of these boundaries is provided in relation to stage 340.

Figure 4:
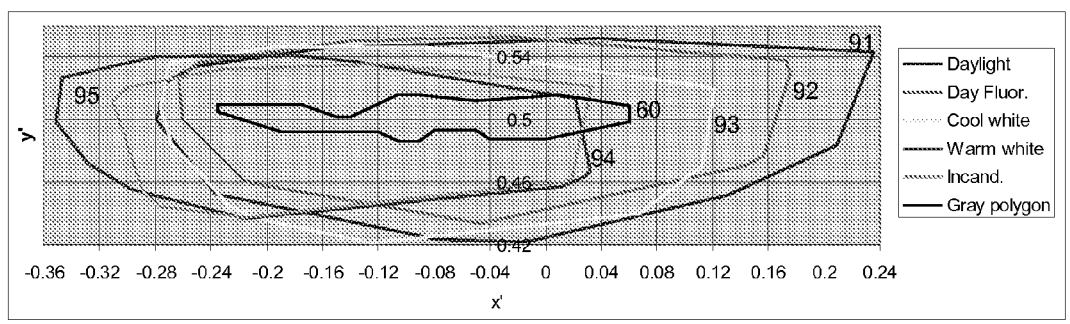
FIG. 4 illustrates multiple color gamuts and multiple candidates according to an embodiment of the invention.
Figure 6:
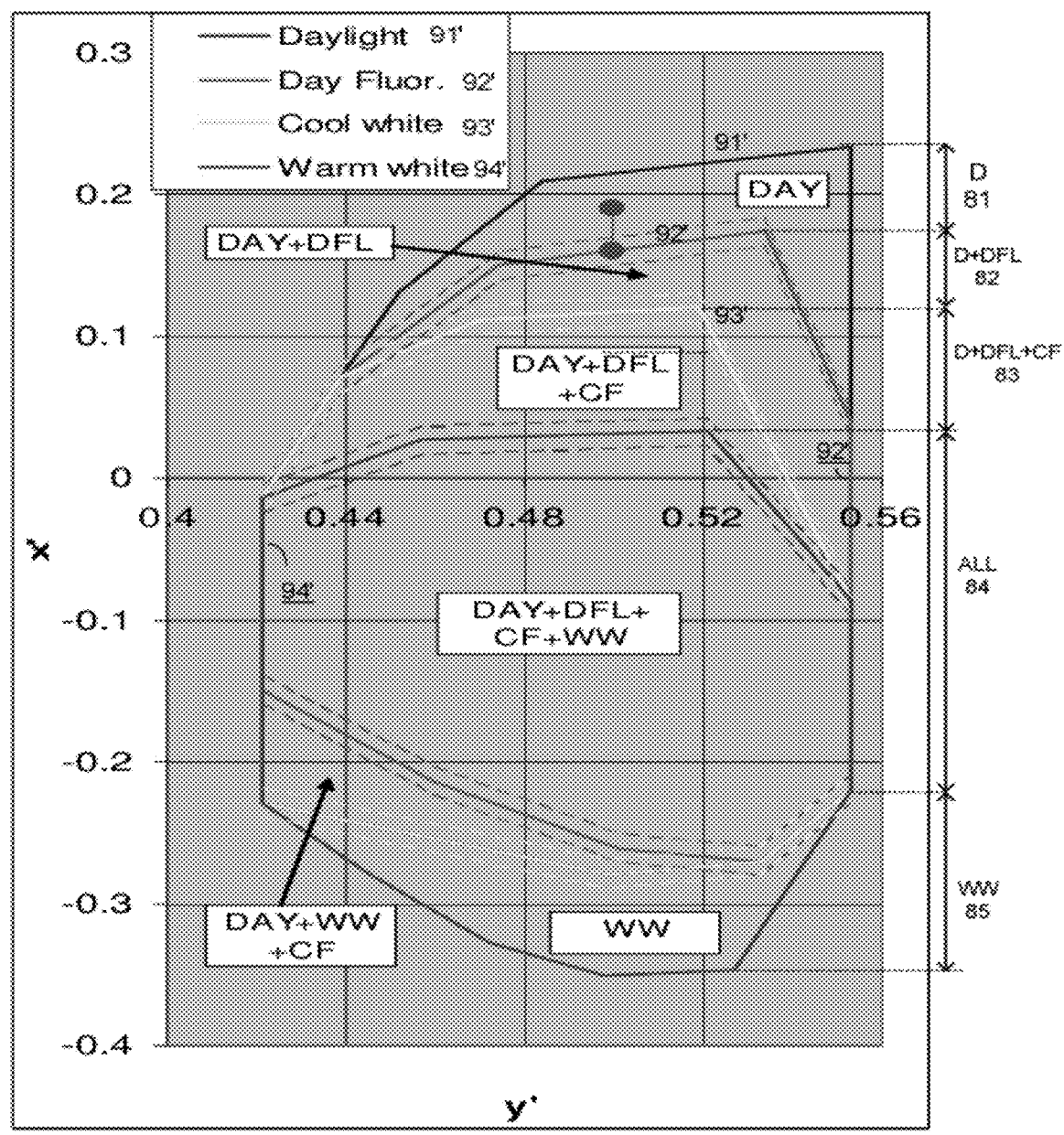
FIG. 6 illustrates a one-dimensional representation of color gamuts of different illumination conditions, and low complexity two dimensional color gamuts according to an embodiment of the invention.

FIG. 4 illustrates multiple color gamuts 91-95 for different illumination conditions in the (x',y') chromaticity space according to an embodiment of the invention. These color gamuts include a daylight color gamut 91, a day fluorescent color gamut 92, a cool white color gamut 93, a warm light color gamut 94, an incandescent illumination color gamut 95 and a gray polygon color gamut 95. FIG. 6 illustrates a one-dimensional representation of color gamuts of different illumination conditions, and low complexity two dimensional color gamuts according to an embodiment of the invention.

The one-dimensional representation includes multiple sections—section D 81 represents daylight illumination, section D+DFL 82 represent daylight illumination and day fluorescent illumination, section D+DFL+CF 83 represents daylight illumination, day fluorescent illumination and cool white illumination, section ALL 84 represents all illumination conditions, section WW 85 illustrates warm white illumination condition.

It is noted that the transition between one section to another can be smooth, thus the boundaries of these sections define small overlap areas. For example, sections D 81 and D+DFL 82 share an overlap portion and each candidate within this overlap portion is considered as a daylight candidate and as a daylight and day fluorescent candidate.

The low complexity two dimensional color gamuts include: daylight color gamut 91', day fluorescent color gamut 92', cool white color gamut 93' and warm light color gamut 94'. These color gamuts are relatively large and they cover most of the chromaticity space—thus allowing performing white balancing based upon a large number of candidates. These color gamuts are partially overlapping and reflect real image acquisition in which a chromaticity value pair of a pixel area can be attributed to a color (or colors) of an illuminated object and to the illumination condition.

These color gamuts are characterized by low complexity and it is very easy to determine whether a candidate is relevant to a certain color gamut or not. A candidate is relevant if it falls inside a color gamut or alternatively if it falls outside the color gamut but is proximate to it. All color gamuts have horizontal upper boundaries that overlap each other. All color gamuts have horizontal lower boundaries that overlap each other. It is noted that for simplicity of explanation FIG. 6 is tilted by 90 degrees and the x-axis is vertical. It is noted that the abovementioned upper and lower boundaries are substantially parallel to the X' axis and thus are termed horizontal.

The side boundaries of all color gamuts are convex and most of them include only three lines.

The shape of these color gamuts simplify the calculation of a relationship between a candidate and a color gamut as only few linear equations (of one or two boundaries of the color gamut) should be calculated at most in order to determine the spatial relationship between the candidate and the color gamut.

Stage 330 is followed by stage 340 of selecting selected candidates by filtering the candidates. The filtering is responsive to at least one filtering parameter.

Figure 5:
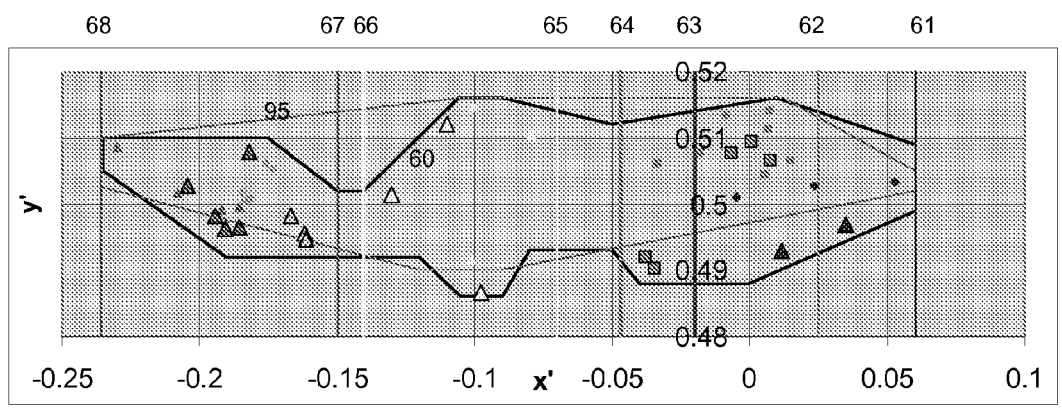
FIG. 5 illustrates a gray polygon and multiple portions of the gray polygon, according to an embodiment of the invention.

As indicated above, the filtering parameters can be the boundaries of a portion of a gray polygon. Each portion is associated with an illumination condition. FIG. 5 illustrates gray polygon 60 and multiple boundaries 61-68 such as daylight illumination boundaries 61 and 63, day fluorescent illumination boundaries 62 and 64, cool white illumination boundaries 65 and 67 and warm white illumination boundaries 66 and 68. These boundaries define overlapping portions.

After an illumination condition is defined—typically in response to locations of candidates—the gray polygon portion that corresponds to that illumination condition is selected. Thus, other candidates are filtered out. It is noted that candidates that are outside the boundaries of the selected portion but proximate to the boundary can also be regarded as selected candidates. The candidates can receive weights that reflect their location in relation to the selected portion.

Stage 340 is followed by stage 350 of calculating at least one white balance compensation parameter in response to pixel information of the selected pixel areas.

Chromaticity values (or other format of color information) of the selected candidates can be processed in order to provide at least one white balance compensation parameter.

Stage 350 can include stage 351 and 352.

Stage 351 includes calculating a digital image imbalance estimation. It can be responsive to chromaticity values (or other format of color information) of the selected candidates. It can be, for example, a weighted average but this is not necessarily so. Various statistical processes can be applied during stage 351.

It is noted that selected candidates can also have chromaticity value pairs that fall outside a selected gray polygon portion but are proximate to the selected gray polygon portion. Conveniently, the weight assigned to such candidates differ (usually lower) to the weight assigned to candidates that their chromaticity value pairs fall within the selected gray polygon portion. A weight can be inversely proportional to the distance between the selected gray polygon portion and the candidate but this is not necessarily so. For example—the weight can be a non-linear function of that distance, or can be a function that is not responsive to that distance. These weights are taken into account during stage 351.

Stage 352 includes calculating at least one white balance compensation parameter in response to the digital image imbalance estimation. The difference between the digital imbalance estimation and a target (for example a target that has equal R, G and B values) should be compensated by at least one white balance compensation parameter.

Stage 350 is followed by stage 360 of providing a compensated digital image by applying at least one white balance compensated parameter.

Method 300 can include preliminary stage 301 of generating the color gamuts, for example, during a calibration phase.

Stage 301 can include at least one of the following stages: stage 302 of generating one-dimensional representations of color gamuts of different illumination conditions; stage 303 of generating a two-dimensional representations of color gamuts of different illumination conditions that share a horizontal upper boundary and a horizontal lower boundary; and stage 304 of generating partially overlapping low-complexity two-dimensional representations of color gamuts of different illumination conditions that cover a substantial part of a chromaticity space.

Figure 8:
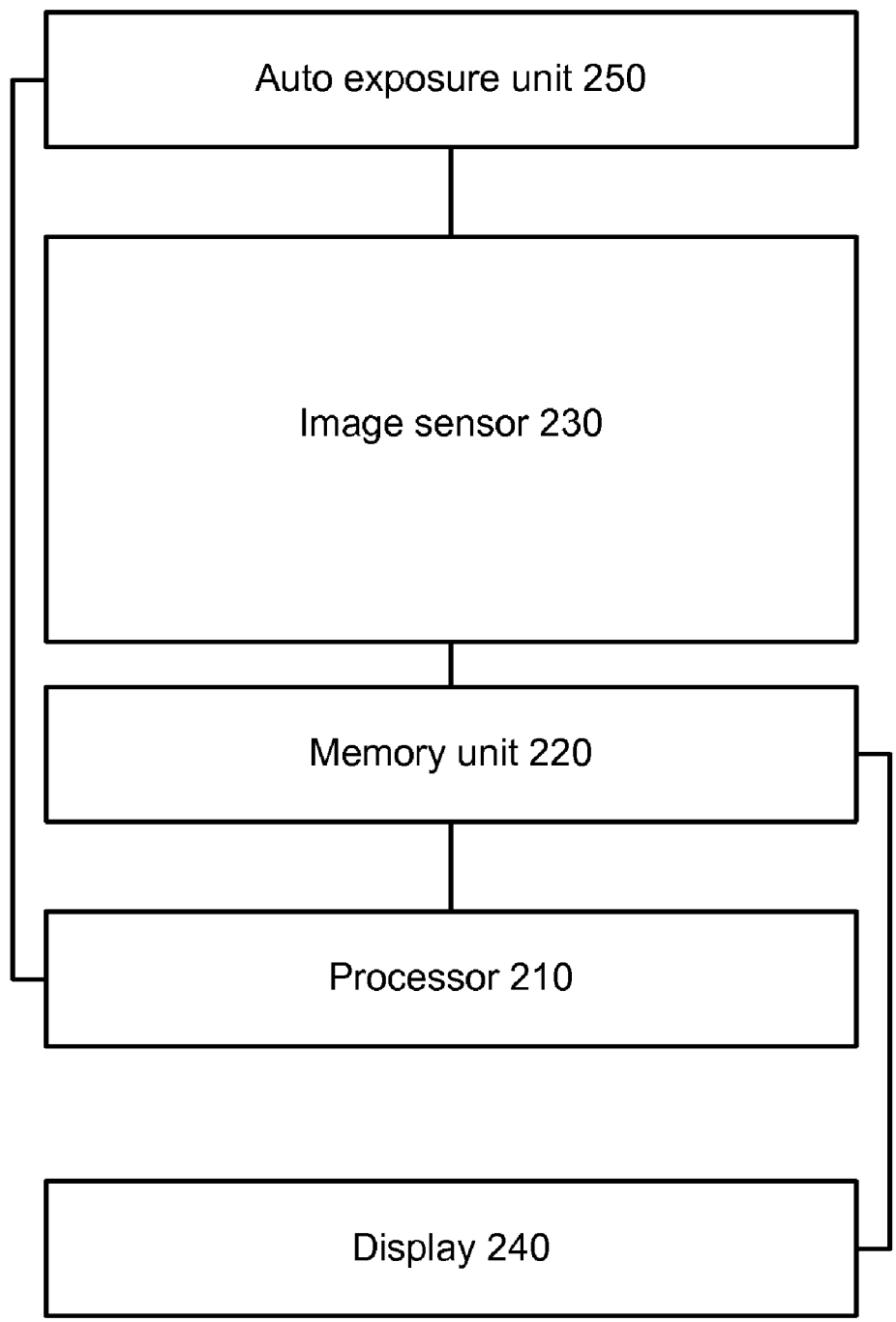
FIG. 8 illustrates a device according to an embodiment of the invention.

FIG. 8 illustrates device 200 according to an embodiment of the invention.

Device 200 has color gamut based white balancing capabilities. Device 200 includes processor 210 and memory unit 220.

FIG. 8 illustrates device 200 that is a camera and also includes image sensor 230, display 240, and auto exposure unit 250.

It is noted that device 200 can differ from a camera and can be, for example, a stand alone computer that receives images that are acquired by other devices, and generate a white balance compensated image. These white balance compensated image can be stored in device 200, can be displayed by device, and/or can be transmitted from device to another device, memory unit, or display.

Referring to FIG. 8, image sensor 230 acquires a digital image that is sent to memory unit 220. Processor 210 can process the digital image to provide a white balance compensated image. This white balance compensated image can be stored in memory unit 220, and/or displayed on display 240.

Auto exposure unit 250 can estimate an illumination condition, and this estimate can assist in the image acquisition process and even out the white balancing process. For example, this estimation can use in the selection of a selected gray polygon portion.

Memory unit 220 stores the digital picture and can also store mapping coefficient, chromaticity value pairs, color gamut information, at least one white balance compensation parameter, and a white balance compensated image.

Processor 210 can execute various stages of method 300. For example, it can (when executing a code): (i) determine at least one filtering parameter based upon a relationship between candidates and color gamuts that are associated with different illumination conditions; wherein each candidate represents a pixel area; (ii) select selected candidates by filtering the candidates; wherein the filtering is responsive to at least one filtering parameter; (iii) calculate at least one white balance compensation parameter in response to pixel information of the selected pixel areas; and (iv) provide a compensated digital image by applying at least one white balance compensated parameter.

It is noted that a computer program product can be provided. It includes a tangible computer readable medium that stores code that once executed by a computer (such as processor 210 of device 200) causes the computer to: (i) determine at least one filtering parameter based upon a relationship between candidates and color gamuts that are associated with different illumination conditions; wherein each candidate represents a pixel area; (ii) select selected candidates by filtering the candidates; wherein the filtering is responsive to at least one filtering parameter; (iii) calculate at least one white balance compensation parameter in response to pixel information of the selected pixel areas; and (iv) provide a compensated digital image by applying at least one white balance compensated parameter.

The code can cause the computer to execute any stage of method 300 or a combination thereof.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

I claim:

1. A method for performing a color gamut based white balancing of a digital image, the method comprises:

generating candidates that have chromaticity value pairs within a chromaticity space in which a black body line is horizontal;

determining at least one filtering parameter based upon a relationship between the candidates and color gamuts that are associated with different illumination conditions; wherein each candidate represents a pixel area;

selecting selected candidates by filtering the candidates; wherein the filtering is responsive to at least one filtering parameter;

calculating at least one white balance compensation parameter in response to pixel information of the selected pixel areas; and providing a compensated digital image by applying at least one white balance compensated parameter.

2. The method according to claim 1 wherein the determining is responsive to candidates that have chromaticity value pairs that are located outside a color gamut but in proximity to the color gamut.

3. The method according to claim 2 wherein the determining is responsive to weights assigned to candidates that have chromaticity values that are located outside a color gamut but are proximate to the color gamut; wherein the weight of a candidate is inversely proportional to a distance between the chromaticity value pair of the candidate and a proximate color gamut.

4. The method according to claim 1 comprising generating one-dimensional representations of color gamuts of different illumination conditions.

5. The method according to claim 1 comprising determining a relationship between candidates and boundaries of one-dimensional representations of color gamuts of different illumination conditions.

6. The method according to claim 1 comprising generating a two-dimensional representations of color gamuts of different illumination conditions that share a horizontal upper boundary and a horizontal lower boundary.

7. The method according to claim 1 comprising determining the relationship between candidates and boundaries of two-dimensional representations of color gamuts of different illumination conditions that share a horizontal upper boundary and a horizontal lower boundary.

8. The method according to claim 1 comprising generating partially overlapping low-complexity two-dimensional representations of color gamuts of different illumination conditions that cover a substantial part of a chromaticity space.

9. The method according to claim 1 comprising determining the relationship between candidates and boundaries of partially overlapping low-complexity two-dimensional representations of color gamuts of different illumination conditions that cover a substantial part of a chromaticity space.

10. The method according to claim 1 wherein the determining is responsive to a location of outmost chromaticity values.

11. A device having color gamut based white balancing capabilities, the device comprises a processor and a memory unit; wherein the memory unit stores the digital picture; wherein the processor is adapted to:
generate candidates that have chromaticity value pairs within a chromaticity space in which a black body line is horizontal;
determine at least one filtering parameter based upon a relationship between the candidates and color gamuts that are associated with different illumination conditions; wherein each candidate represents a pixel area;
select selected candidates by filtering the candidates; wherein the filtering is responsive to at least one filtering parameter;
calculate at least one white balance compensation parameter in response to pixel information of the selected pixel areas; and
provide a compensated digital image by applying at least one white balance compensated parameter.

12. The system according to claim 11 wherein the processor is adapted to determine at least one filtering parameter in response to candidates that have chromaticity value pairs that are located outside a color gamut but in proximity to the color gamut.

13. The system according to claim 12 wherein the processor is adapted to determine at least one filtering parameter in response to weights assigned to candidates that have chromaticity values that are located outside a color gamut but are proximate to the color gamut; wherein the weight of a candidate is inversely proportional to a distance between the chromaticity value pair of the candidate and a proximate color gamut.

14. The system according to claim 11 wherein the processor is adapted to generate at least one filtering parameter in response to generating one-dimensional representations of color gamuts of different illumination conditions.

15. The system according to claim 11 wherein the processor is adapted to determine a relationship between candidates and boundaries of one-dimensional representations of color gamuts of different illumination conditions.

16. The system according to claim 11 wherein the processor is adapted to generate a two-dimensional representations of color gamuts of different illumination conditions that share a horizontal upper boundary and a horizontal lower boundary.

17. The system according to claim 11 wherein the processor is adapted to determine the relationship between candidates and boundaries of two-dimensional representations of color gamuts of different illumination conditions that share a horizontal upper boundary and a horizontal lower boundary.

18. The system according to claim 11 wherein the processor is adapted to generate partially overlapping low-complexity two-dimensional representations of color gamuts of different illumination conditions that cover a substantial part of a chromaticity space.

19. The system according to claim 11 wherein the processor is adapted to determine the relationship between candidates and boundaries of partially overlapping low-complexity two-dimensional representations of color gamuts of different illumination conditions that cover a substantial part of a chromaticity space.

20. The system according to claim 11 wherein the processor is adapted to determine at least one filtering parameter in response to a location of outmost chromaticity values.

21. A computer program product the comprises a tangible computer readable medium that stores code that once executed by a computer cause the computer to: generate candidates that have chromaticity value pairs within a chromaticity space in which a black body line is horizontal; determine at least one filtering parameter based upon a relationship between the candidates and color gamuts that are associated with different illumination conditions; wherein each candidate represents a pixel area; select selected candidates by filtering the candidates; wherein the filtering is responsive to at least one filtering parameter; calculate at least one white balance compensation parameter in response to pixel information of the selected pixel areas; and provide a compensated digital image by applying at least one white balance compensated parameter.

* * * * *